United States Patent [19]

Principe et al.

[11] Patent Number: 4,970,503
[45] Date of Patent: Nov. 13, 1990

[54] METHOD FOR CONTINUOUSLY AND AUTOMATICALLY MONITORING THE ELECTRICAL OPERABILITY AND CONTROL CAPABILITY IN A LIQUID CRYSTAL DISPLAY UNIT

[75] Inventors: Francesco Principe, Bari; Vito Gargano, Bitetto, both of Italy

[73] Assignee: Nuovopignone-Industrie Meccaniche e Fonderia S.p.A., Florence, Italy

[21] Appl. No.: 222,814

[22] Filed: Jul. 21, 1988

[30] Foreign Application Priority Data

Jul. 24, 1987 [IT] Italy .................. 21429 A/87

[51] Int. Cl.$^5$ ............ G05B 23/00; G08B 21/00
[52] U.S. Cl. .................. 340/825.060; 340/715; 340/765; 340/642
[58] Field of Search .......... 324/60 C, 60 CD, 548; 340/641, 715, 518, 825.1, 825.06, 642, 765; 73/780; 350/330, 332, 345

[56] References Cited

U.S. PATENT DOCUMENTS 4,247,852 1/1981 Utzinger ............... 340/641
4,311,993 1/1982 Strobel ............... 340/641

FOREIGN PATENT DOCUMENTS 2080593 2/1982 United Kingdom ......... 340/765

Primary Examiner—Donald J. Yusko
Assistant Examiner—Yuk H. Lau
Attorney, Agent, or Firm—Birch, Stewart, Kolasch & Birch

[57] ABSTRACT

A method for continuously and automatically monitoring the electrical operability and control reliability in a liquid crystal display unit and comprising, inter alia, determining the discharge or charge time of a capacitor comprised of a segment and the backplate or return electrode of the display unit when a voltage waveform fed to the segment has been disconnected, said time being determined by a binary counter which commences at the moment of disconnection of the feed waveform and stops when the capacitive discharge or charge waveform differs in binary state from the value of the segment feed wave.

4 Claims, 3 Drawing Sheets

METHOD FOR CONTINUOUSLY AND AUTOMATICALLY MONITORING THE ELECTRICAL OPERABILITY AND CONTROL CAPABILITY IN A LIQUID CRYSTAL DISPLAY UNIT

This invention relates to a method which enables the electrical integrity or operability of a liquid crystal display unit or LCD and the control reliability of said display unit to be continuously and automatically monitored in an economical, simple, effective and metrologically correct manner.

In many countries, legal metrology regulations require that in apparatus utilized for weighing or measuring products to be sold, the displayed delivered quantity, price and total to be paid must always be able to be checked in terms of electrical integrity.

For this purpose, said apparatus generally use display units possessing an intrinsic facility for checking, such as seven-segment Nixie tubes consisting substantially of seven-filament lamps, or LED display units in which the segments are light emitting diodes. In this respect, in said display units it is necessary only to measure the current passing through the activated segments to verify their operability. In seven-segment electromagnetic displays in which each segment is activated by a coil, continuity is directly verified by current passage and an interruption in only one coil is sufficient to block the entire apparatus.

Unfortunately this type of checking cannot be used in liquid crystal display units or LCDs because the current absorbed for their activation is practically zero and because of this their proper functioning cannot readily be checked. Thus because of resultant difficulties in their legal approval they are not used in practice in these types of apparatus, even though such display units are economical, very reliable, present a pleasant appearance and have the advantage of consuming practically no energy.

In this respect, in the present state of the art the proper operation of a liquid crystal display unit can only be checked on an intermittent non-automatic basis by an auxiliary manual pushbutton testing system which displays all the unit segments simultaneously only in the event there are no abnormalities, or by means of a second parallel-controlled display unit which enables an operator to check for any abnormalities by a comparison procedure and to take appropriate action.

Such checks, besides being complicated to carry out, also have a considerable drawback of requiring the continuous presence of an operator, resulting in increased costs, and the consequent possibility of human error. Again, this intermittent checking means that such display units cannot be used in apparatus making non-repeatable measurements such as relating to fuel delivery, for which any connecting action must be taken immediately when the abnormality arises, otherwise the displayed quantity of an already delivered product would be in error and the quantity could no longer be remeasured.

The object of the present invention therefore is to obviate the aforementioned limitations by providing a method for monitoring the electrical and control effectiveness in a liquid crystal display unit or LCD which besides being economical allows effective continuous and automatic monitoring of the state of the liquid crystal display unit. This is summary attained in the subject invention by having each segment of the unit form the plate of a capacitor the other plate of which is the rear wall or return electrode or backplane of the display unit. The continuously measured capacitance of this capacitor is then used for monitoring the electrical operability of the LCD unit with, this capacitance being compared with maximum and minimum set values, and any excess or deficiency with respect to these set limits being used to generate a blocking or inhibiting signal as an indication of an alteration or deterioration in said capacitor resulting from its degradation with time, loss of nematic liquid or mechanical breakage.

The capacitance of each segment of the liquid crystal display unit can be measured in various ways, one of which consists of measuring the current variations occurring in each segment of the display unit at each switch-over, but this method would obviously be very costly as it would require a number of current indicators equal to the number of segments to be checked. A simpler method would be to measure the current variations occurring only in the control circuit of the return electrode or backplane for each switch-over of each individual segment, but this method has the drawback of not being able to monitor continuously as it necessarily presupposes activation of the individual segments by the control system in succession. Moreover the presence of inevitable parasite capacitance means that the measurements are unreliable.

Said drawbacks are obviated by a method according to the present invention, by which said capacitance of each segment of the display unit is determined as a function of the discharge or charge time of the relative capacitor after interrupting a square wave signal feed to the segment, said time being proportional to the capacitance. Finally the method according to the invention also includes both monitoring the likeness of the square wave control signal with the corresponding signal displayed on each segment of the display unit, this indicating absence of imperfections in the electrical circuits of the display unit control systems, and monitoring the presence of the capacitive effect, thus indicating a no fault connection of the control system to the relative display unit segment, said monitoring being executed directly by comparing at predetermined times the digital binary state of the control signal with the voltage binary state of the across each segment.

Thus, the method for continuously and automatically monitoring the electrical operability and control reliability in a liquid crystal display unit in which the return electrode or backplane is fed a square wave from a generator which, suitably changed in binary state by the control signal, also feeds all the display unit segments so that they are either visible or non-visible according to whether the relative feed wave is respectively of an opposite or like binary state relative to the feed square wave of the backplane and, is characterised according to the present invention in that for each display unit segment, the segment feed wave is compared at regular times $t_0$ with the voltage applied to the segment after its squaring, and any difference resulting from this comparison is used to block or inhibit operation of the unit; the feed to said segment is disconnected for regular time durations $t_1$ and a binary counter starts to count and continues counting for the time required for the capacitive discharge or charge voltage of the segment, converted into a binary digital value, to differ a binary state from said segment feed wave, this counter output value, which is proportional to the discharge or charge time and thus to the capacitance between the segment under examination and the backplane, being then compared with a maximum and a minimum set time value in order, by way of an electronic OR element, to block or inhibit the unit if said output value is greater than the maximum value or less than the minimum value; and finally, with the segment feed disconnected, said segment feed wave is compared at regular times $t_2$ within said time duration $t_1$ with said capacitive discharge or charge voltage converted into digital value, so that any binary state inequality therein at time $t_2$ causes blockage of the unit.

BRIEF DESCRIPTION OF THE DRAWINGS

The invention is described hereinafter with reference to the accompanying drawings which illustrate a preferred embodiment thereof by way only of non-limiting example in that technical, technological or constructional modifications can be made thereto but without leaving the scope of the present invention.

In said drawings.

DETAILED DESCRIPTION OF THE INVENTION

Figure 1:
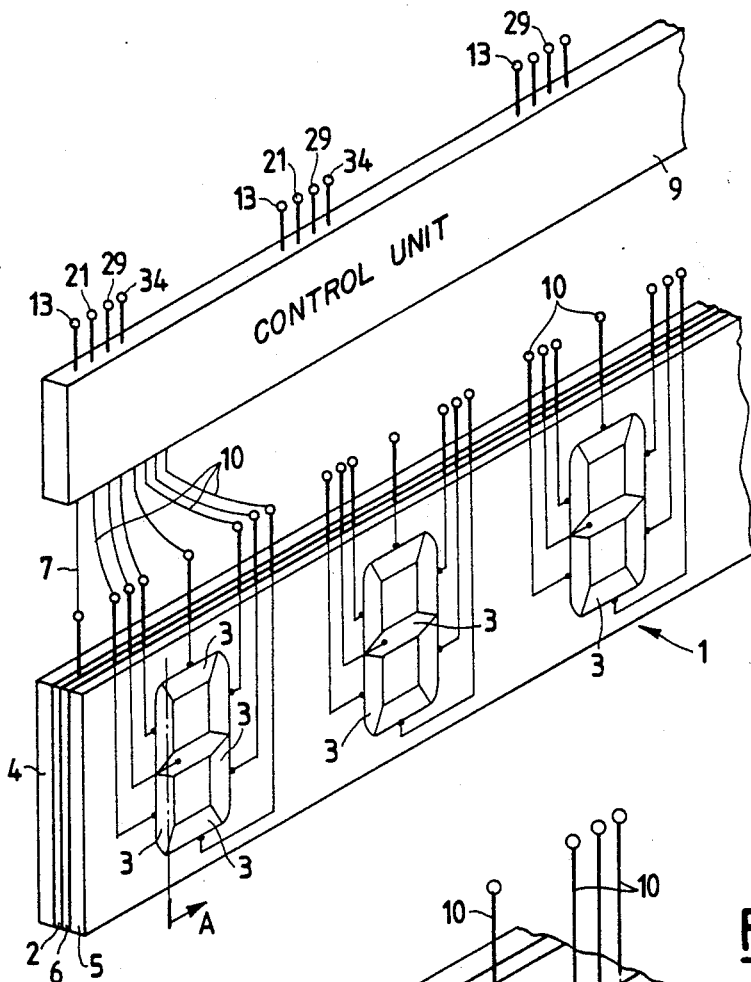
FIG. 1 is a partial perspective view of a numerical liquid crystal display unit using the method for continuously and automatically monitoring the electrical efficiency and control consistency according to the invention.
Figure 2:
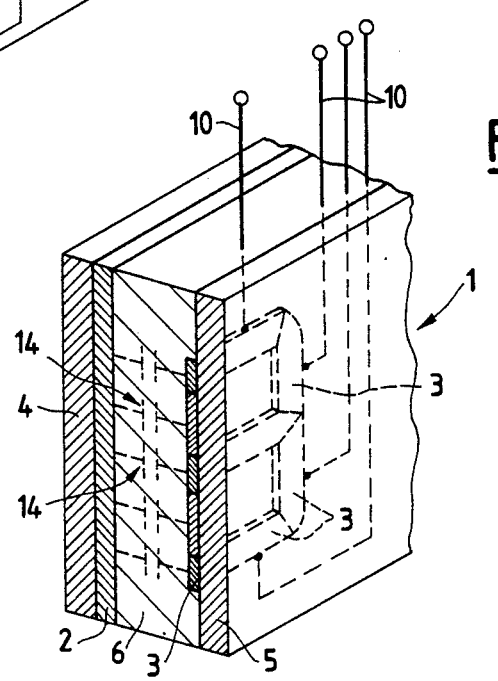
FIG. 2 is a partial perspective sectional view on the line A—A of the numerical liquid crystal display unit of FIG. 1.
Figure 3:
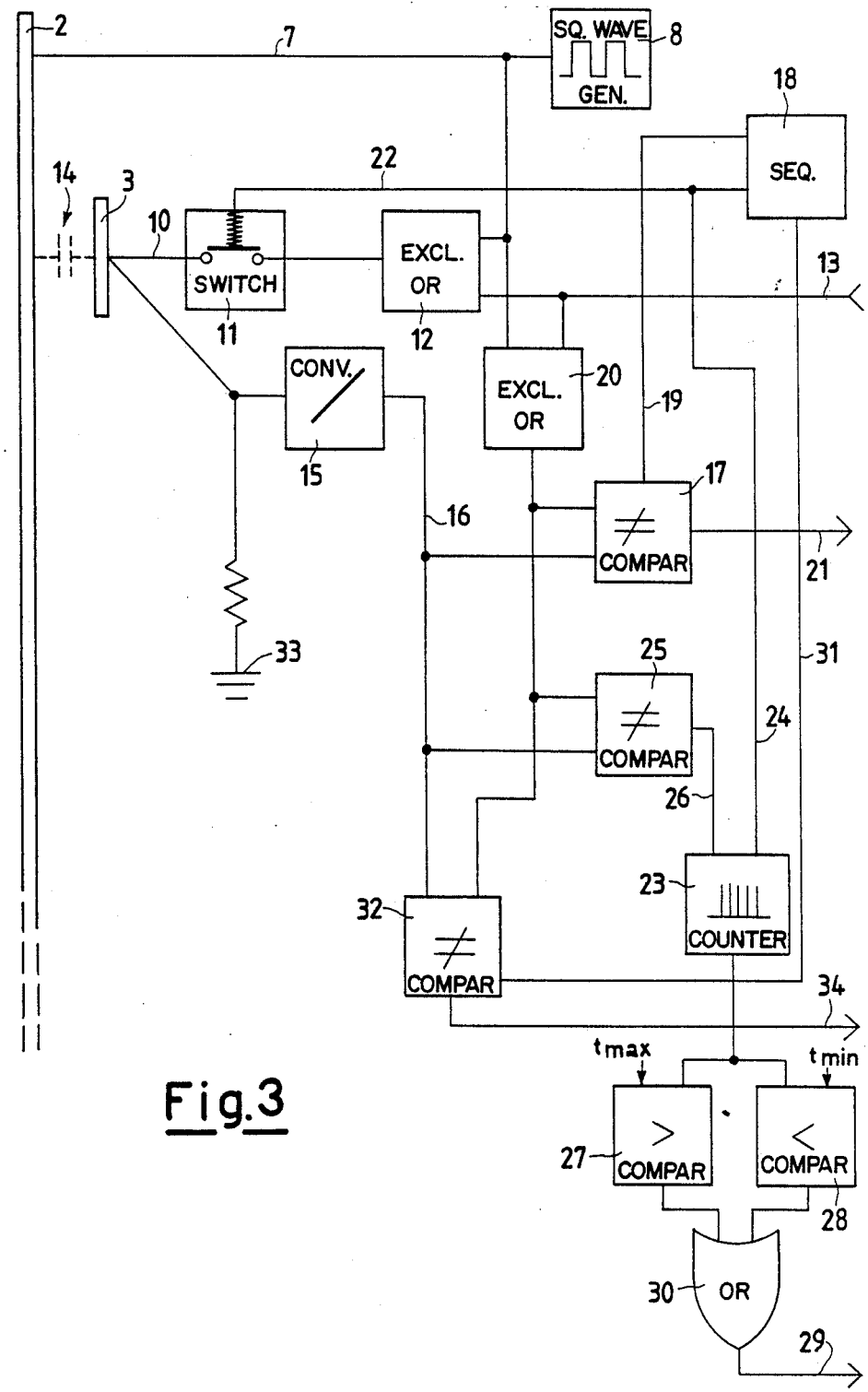
FIG. 3 is a block diagram of the monitoring method according to the invention.
Figure 4:
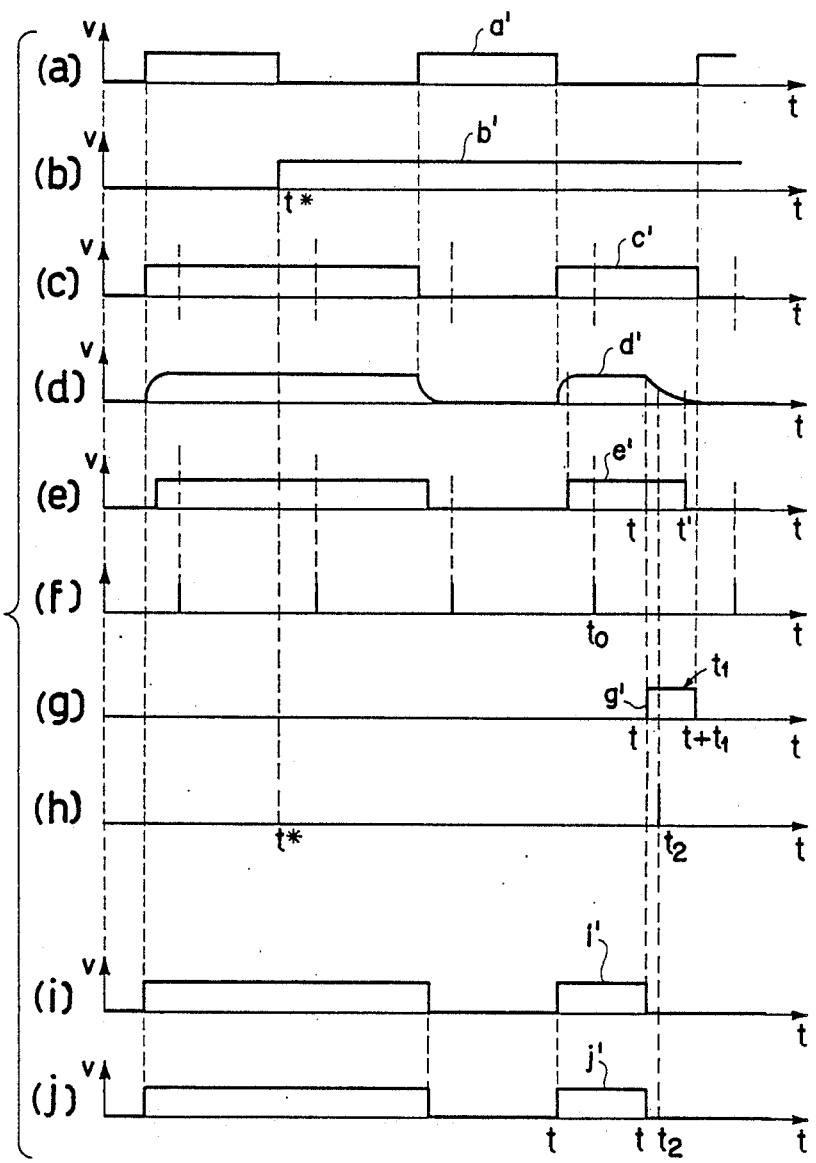
FIGS. 4(a)-4(j) are illustrative of a set of wave forms present at the different points of the block diagram of FIG. 3 during the implementation of the method according to the invention.

In FIGS. 1, 2 and 3 reference numeral 1 generally indicates a liquid crystal display unit consisting substantially of a transparent return electrode or backplane 2 and plurality of segments 3 arranged as a figure eight parallel to the backplane 2, with said elements, being applied respectively to two opposing glass sheets 4 and 5, enclosing the liquid crystals in the intermediate zone 6. The return electrode or backplane 2 is connected by an electrical conductor 7 to a square wave generator as shown in FIG. 3 which is contained in a control unit 9 and feeds it with a square wave as shown in FIG. 4a. Further as shown in FIG. 3, each of the segments 3 are connected by an electrical conductor 10 through a switch 11 to an exclusive OR gate 12 which phase-modulates the square wave from the generator 8 connected to it in accordance with a control signal originating from a logic unit, not shown on the figure, by way of the electrical conductor 13.

FIG. 4b depicts the control signal for a single element, according to which at time $t^*$ the feed wave $a'$ for the segment 3, shown in FIG. 4c, passes from being of a like binary state with the backplane feed wave (see FIG. 4a) to having an opposite state; thus making the segment visible.

Each display unit segment 3 creates with the backplane 2 a capacitor 14 the presence of which changes the voltage wave on the segment from the form shown in FIG. 4c to that shown in FIG. 4d as $d'$ (left hand side of the figure) so that, to obtain a comparable signal, the wave $d'$ is fed to a converter 15 which squares it again to provide at its output lead 16 the wave $e'$ of FIG. 4e.

This voltage wave on the segment 3 and present at lead 16 (wave of FIG. 4e) is then fed as $e'$ to a comparator 17 in which it is compared, at regularly spaced stroke as shown in determined by a sequencer 18 by way of the electrical conductor 19, with the feed wave $c'$ of the segment 3 (FIG. 4c) existing at the output of the element 20 which, as in the case of the element 12, is an exclusive OR gate to which the square wave of the generator 8 and the control signal present in on lead 13 fed. If at the comparison times $t_0$ the compared waves, contrary to that shown in FIG. 4, do not have the same binary state, this being an indication that malfunctions exist in the electrical circuits, the comparator 17 provides at its output 21 an activation signal for a blocking device, not shown on the figures.

The switch 11 is open via a signal $g'$ on conductor 22 at regular time intervals t determined by said sequencer 18 for a duration of $t_1$ (see FIG. 4g), and at the same time a binary counter 23 starts to count by way of an electrical conductor 24. At this point, since the segment 3 is no longer powered it discharges its capacitance 14 with a certain discharge time constant, as shown on the right hand side of wave $d'$ of FIG. 4d, and consequently the wave $e'$ shown on the right hand side of FIG. 4e will be present at the output 16 of the converter 15.

As can be clearly seen in the figures, this latter wave $e'$ goes to the baseline at the time $t'$ (FIG. 4e) corresponding to the end of discharge of the capacitor 14, and starting from this time $t'$ it has a different binary state from the feed wave $c'$ (FIG. 4c) of the segment 3, so that the comparator 25, which receives the two waves $c'$ and $e'$ at its inputs, provides an output signal 26 which stops the count of the counter 23 precisely at the time $t'$. Thus, the counter 23 counts the time $t't$, which is precisely the discharge time of the capacitor 14. This time value is then compared in the comparator 27 with a set maximum value $1_{max}$ and in the comparator 28 with a set minimum value $1_{min}$ so that at the output 29 of the OR gate 30 a signal is present which activates the blocking device whenever said discharge time has a value outside the set range $1_{max}-1_{min}$. Finally, at regular occurring times $t_2$ (see FIG. 4h), again determined by the sequencer 18 through the electrical conductor 31, said time $t_2$ being chosen to be within the time duration $t_1$ of wave $g'$ for which the switch 11 is open, the comparator 32 checks the presence or absence of the capacitive effect 14. In this respect, at the time $t$ at which the switch 11 is opened, if no capacitance 14 exists the segment 3 is immediately set at the zero level or ground potential 33 and thus at the input of the converter 15 there is the wave $i'$ shown in FIG. 4i which is at zero level at time $t$. The wave $l'$ at the output 16 of the converter 15 is instead shown in FIG. 4j and it can be clearly seen that at time $t_2$ the comparator 32, on comparing the wave $l'$ of FIG. 4(j) with the wave $c'$ of FIG. 4c, sees different binary state and thus provides at 34 an activation signal for said blocking i.e. inhibiting operation of the device.

Having thus shown and described what is at present considered to be the preferred method of the subject invention, it should be noted that certain modifications and changes may be made without departing from the spirit and scope of the invention as set forth in the appended claims.

We claim:

1. A method for monitoring the electrical operability of a liquid crystal display comprised of a plurality of display segments separated from a common backplate to form a plurality of capacitors, wherein each of said segments comprises a first electrode and said backplate comprises a second electrode for the application of an energizing voltage thereacross, comprising the steps of:

applying a first binary voltage to said backplate;

applying a second binary voltage to at least one of said segments;

sensing the voltage at said one segment and generating a third binary voltage therefrom;

comparing the binary states of said second and third voltages at a predetermined time;

in the event a difference in binary states exists between said second and third binary voltages at said predetermined time, inhibiting the application of the energizing voltage across said first and second electrodes;

interrupting the application of said binary voltage to said at least one segment for a selected time period;

during said selected time period, determining the discharge time of the capacitance formed by said one segment and said backplate upon the application of said second binary voltage;

comparing the discharge time with at least one predetermined time limit;

in the event said discharge time differs from said one time limit by a predetermined value, inhibiting the application of the energizing voltage across said first and second electrodes;

comparing the binary states of said second and third voltages within said selected time period of said interrupting step; and in the event a difference in binary states exists between said second and third binary voltages within said selected time period, inhibiting the application of the energizing voltage across said first and second electrodes.

2. The method of claim 1 wherein said second voltage comprises a composite output voltage of an exclusive OR logic gate circuit resulting from applying said first binary voltage along with a binary control voltage to the inputs thereof.

3. The method of claim 1 wherein the second recited step of comparing further comprises comparing the discharge time with another time predetermined time limit, and wherein the second recited step of inhibiting comprises inhibiting the application of the energizing voltage when said discharge time differs from said another time limit by another predetermined time value.

4. The method of claim 3 wherein said one time limit comprises a maximum time limit and said another time limit comprises a minimum time limit and wherein said predetermined values respectively comprise values greater than said maximum time limit and less than said minimum time limit.

* * * * *